(12) United States Patent
Xie (10) Patent No.: US 7,697,921 B2
(45) Date of Patent: *Apr. 13, 2010

(54) METHODS OF RECORDING VOICE SIGNALS IN A MOBILE SET

(75) Inventor: Fei Xie, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/551,333

(22) Filed: Oct. 20, 2006

(65) Prior Publication Data

US 2007/0049327 A1    Mar. 1, 2007

Related U.S. Application Data

(63) Continuation of application No. 09/747,392, filed on Dec. 22, 2000, now Pat. No. 7,136,630.

(51) Int. Cl.
*H04M 1/725* (2006.01)

(52) U.S. Cl. ............... 455/412.1; 455/412.2; 455/550.1; 455/556.2; 707/205

(58) Field of Classification Search .................. 445/13, 445/563; 379/88.01
See application file for complete search history.

(56) References Cited

U.S. PATENT DOCUMENTS

| | | | |
|---|---|---|---|
| 3,936,610 A | 2/1976 | Schiffman | |
| 4,495,647 A | 1/1985 | Burke et al. | |
| 5,249,217 A | 9/1993 | Lee | |
| RE34,976 E | 6/1995 | Helferich et al. | |
| 5,519,684 A | 5/1996 | Iizuka et al. | |
| 5,839,110 A | 11/1998 | Maeda et al. | |
| 5,867,793 A | 2/1999 | Davis | |
| 5,995,824 A | 11/1999 | Whitfield | |
| 6,064,792 A | 5/2000 | Fox et al. | |
| 6,069,648 A * | 5/2000 | Suso et al. | 348/14.02 |
| 6,233,320 B1 | 5/2001 | Haimi-Cohen | |
| 6,243,594 B1 | 6/2001 | Silberfenig | |
| 6,415,029 B1 * | 7/2002 | Piket et al. | 379/406.04 |
| 6,421,353 B1 | 7/2002 | Kim | |
| 6,453,285 B1 | 9/2002 | Anderson et al. | |
| 6,510,208 B1 | 1/2003 | Komiya | |
| 6,526,128 B1 | 2/2003 | Kermani | |
| 6,671,353 B1 | 12/2003 | Goh | |
| 6,718,298 B1 * | 4/2004 | Judge | 704/215 |
| 6,760,696 B1 | 7/2004 | Goldberg et al. | |
| 7,242,924 B2 * | 7/2007 | Xie | 455/412.1 |
| 7,289,791 B2 * | 10/2007 | Xie | 455/413 |

FOREIGN PATENT DOCUMENTS

| | | | |
|---|---|---|---|
| JP | 362167645 A | * | 7/1987 |
| WO | WO 97/01932 | * | 1/1997 |

* cited by examiner

*Primary Examiner*—Yuwen Pan
(74) *Attorney, Agent, or Firm*—McAndrews, Held & Malloy, Ltd.

(57) ABSTRACT

The present invention relates to a mobile set integrating a memory efficient data storage system for the real time recording of voice conversations, data transmission and the like. The data recorder has the capacity to selectively choose the most relevant time frames of a conversation for recording, while discarding time frames that only occupy additional space in memory without holding any conversational data. The invention executes a series of logic steps on each signal including a voice activity detector step, frame comparison step, and sequential recording step. A mobile set having a modified architecture for performing the methods of the present invention is also disclosed.

24 Claims, 4 Drawing Sheets

METHODS OF RECORDING VOICE SIGNALS IN A MOBILE SET

CROSS REFERENCE TO RELATED APPLICATION

This application is a continuation of U.S. application Ser. No. 09/747,392, filed Dec. 22, 2000. The above-identified application is hereby incorporated herein by reference in its entirety.

1. FIELD OF THE INVENTION

The present invention relates generally to telecommunications systems and methods for recording information during phone calls, and specifically to providing methods for recording information to a memory element during a call, in which the conversation is recorded in a way to reduce the storage space utilized in the memory element.

2. BACKGROUND OF THE INVENTION

References for IDS inclusion:
Re. 34,976 (cell phone digital recorder/live conversations)
U.S. Pat. No. 6,064,792 (Fox) deferred recording.
U.S. Pat. No. 4,495,647 (Burke) Digital voice storage mobile.
U.S. Pat. No. 5,519,684 (Iizuka) Digital recorder, multiple tracks.
U.S. Pat. No. 5,995,824 (Whitfield) cell phone vox.
U.S. Pat. No. 5,867,793 (Davis) cell phone vox.
U.S. Pat. No. 3,936,610 (Schiffman) switching controller-output.

Mobile phones (Cellular Phones) have become a standard form of communication in industrialized countries. Communications with people in local and wide area cell networks is common place. An artifact of this form of modern communications is many times it is difficult to hear the voice of a person over a mobile phone. This difficulty stems from both technological and environmental short comings inherent in the communication type.

A mobile phone network is an intricate and complex array of devices. For easy reference this disclosure describes a GSM (Global System for Mobile Communication) style digital mobile phone system. However the invention herein is not limited particularly to this type of system. Generally a GSM is composed of a number of Mobile Service Centers (MSC) and an integrated Visitor Location Register (VLR) therein. The MSC/VLR areas include a number of Location Areas (LA) which are defined as part of a given MSC/VLR area. Mobile sets (MS), or mobile phone subscribers, may freely roam within the coverage area without having to send update location information to the MSC/VLR area that controls the LA. The cellular network is composed of all these elements and a multitude of subscribers, each having a mobile set (MS).

The wide spread use of mobile phones has produced a variety of different cellular networks. Cellular networks within the same region may operate on a different technology base. Some networks experience technical difficulties in the transmission and reception of signal from the MS to the Base Station (BS), the cellular networks reception area for receiving and transmitting information to each MS. These technical difficulties include interference from any number of signal producing sources (including other subscribers), geographical interference, structural interference and the like. The various source can individually or in combination contribute to poor reception of signal from the BS to MS, or for some error in signal from one station to the receiving station (MS/BS) causing the transmission to be garbled or difficult to interpret.

Additionally, the environment where mobile sets are often used in include places where a subscriber may not be able to dedicate their full attention to the conversation on a cell phone (e.g. when driving an automobile) or when the local area the subscriber is in makes hearing difficult (as in an areas having a lot of background noise). To assist in this problem there have been numerous recent developments to allow a subscriber to record information either during or after a conversation, using their MS as either a note pad, dictation device, or recorder for conversations. In all cases the use of the cellular phone as a data storage device produces undesired drawbacks and stretches the limitations of existing cellular phone technology. Some cell phones do offer a voice recording feature, either for live conversation or as a dictation machine. These recorders use existing technology and essentially combine two devices into one casing, instead of integrating a data recording system into the mobile set so that the available real estate and power of a mobile set are optimized.

The signal processing and data handling of a GSM phone utilizes technology which can be adapted for use with the present invention. Conventional GSM mobile phones possess an analog to digital signal converter (ADC) audio filter that converts analog microphone signal to digital speech samples at a sample rate of 8 KHz with 13 bits per sample. Voice encoders may process speech samples in 20 millisecond segments, where each segment is compressed into a speech frame of N bits. The actual number of bits per speech frame depends on the particular speech encoder used. The speech encoder may provide for half rate speech, full rate, enhanced rate or variable rates for adaptive multi-rate speech. The encoder compresses speech so that the number of bits per second is minimized while still giving good quality speech. Voice encoder frames are interleaved and coded for error correction and detection and then transmitted to the base station.

Downlink voice operations, received through the base station, go through the inverse process of the voice encoder. A digital to analog (DAC) audio filter performs inverse operations of the ADC/audio filter in processing downlink speech frames. A voice activity detector (VAD) generates a binary flag (value 0 or 1) indicating whether the subscriber is speaking (value 0) or not (value 1). The VAD used in the GSM standard suppresses transmission during uplink, producing speech silence intervals to conserve the battery charge. It is possible to utilize much of the existing signal processing of a GSM compatible phone to enhance the data storage capacity of a mobile set, and record conversations.

It is an object of the present invention to provide a mobile set having sufficient memory capacity to store voice conversations.

Another objective of the present invention is to provide a means for allowing a subscriber to record a voice conversation in real time for later retrieval.

Another objective of the present invention is to provide a subscriber with the ability to record a conversation and recall the information somewhat contemporaneously in the same phone conversation.

Another object of the present invention is to provide a means to streamline the manner in which voice information is recorded, making greater effective use of the memory element within a subscriber's mobile set.

It is still a further objective of the present invention to allow subscribers to record both voice and data information into a mobile set memory element, and to provide accurate time indexing so the messages can be reproduced in the same form that they were transmitted in.

It is still a further objective of the present invention to provide a data file management system of data stored on the memory element for easy retrieval and sorting, either through the use of the MS or another device such as a desktop computer.

At least one of the present objectives is addressed in the following disclosure.

SUMMARY OF THE INVENTION

The present invention relates to a mobile set having a data recorder system. The invention relates to the capture of real time voice conversations on mobile sets ("cellular phones"), however the system can also be used to capture multimedia signals, e-mail and data transmissions as the technology and capabilities of wireless communications continue to expand.

In one embodiment the invention is a method in a mobile set for storing voice recordings. The method comprises controlling a voice activity detector (VAD) to identify speech containing time frames from at least one uplink and at least one downlink signal and recording the speech containing time frames from the uplink and downlink signals such that each time frame is recorded sequentially with a time stamp for each time frame. In this embodiment the mobile set receives two signals forming the two sides of a phone conversation. To preserve memory space, the individual time frames are arranged sequentially into a single data file and written to memory.

In a second embodiment of the present invention, a method in a mobile set for determining record worthy voice time frames is described. The method comprising receiving a first signal in a voice activity detector, receiving a second signal in the voice activity detector, and comparing the first signal to the second signal. The compared signals must be of the same time frame. The signal having the higher voice data content is selected for recording. It is also permissible to record both signals if both have sufficient voice data meeting a predetermined threshold. Normally only one person is speaking, thus the method of this embodiment allows the recording of only the person who is speaking. As the conversation proceeds, both people may speak, not speak, or only one person speaks. The method of the present embodiment compares each uplink and downlink time frame as paired events, but separate from the preceding time frame, and independent of the following time frame. Signals (either uplink or downlink) containing voice data are selected for recording. Similar to the previous embodiment, if neither person is speaking, then the corresponding time frames will have less than the threshold data required for recording. Those low or no data time frames are replaced with placeholders according to a data compression scheme. The placeholders are again recorded sequentially with the data containing time frames so the data file may be played back with a linear representation of the voice time frames. In the event both people are speaking simultaneously, the present method selects both data containing time frames for recording, but continues to arrange the time frames sequentially. Thus while two records may have the same time frame, they are recorded one following the other into memory. On playback, if two recorded time frames have the same time frame, they are both converted into analog signals and played simultaneously over the mobile set speaker. It is important to note there are a wide variety of combinations for what information is recorded and not recorded. Either the higher data containing frame of one channel is recorded (dropping the lower data containing frame completely, with no place holder) to recording all frames sequentially and everything in between.

In a third embodiment a computer-readable medium containing instructions for controlling a mobile set processor to record multimedia signals is described. The method comprises controlling a voice activity detector to compare a plurality of voice signals having identical time stamps and arranging the voice signals such that data containing time stamp sequences are sequentially placed into a single data file. The method also includes controlling a processor that will identify non-voice signals containing the same time stamp as data containing voice time stamp sequences and sequentially recording the data containing voice signals and the corresponding time stamp non-voice signals such that both the voice and non-voice data signals will be sequentially recorded into a memory element as a single data file. In this embodiment the progression of mobile sets to handle multimedia signals is accommodated. The computer readable medium contains instructions for controlling the mobile set processor first as a voice activity detector, then a multimedia signal processor. Where a mobile set will be capable of handling multimedia signals, the voice activity detector will determine which time frames of speech (either uplink or downlink) contain data. The data containing time frame is then selected for recording into memory. Sequentially the processor identifies any companion signal, such as video signal, having the same time stamp as the voice signal time frame to be recorded. The non-voice time frame (video frame) is the recorded with the corresponding time frame of voice data. In this way the appropriate video sequence of uplink or downlink video is recorded with the speaker (such as in a two way video conference call). If the voice signal is not recorded, the video sequence similarly will not be recorded.

In a forth embodiment, a computer-readable medium containing a data structure for stored phone conversations is described. The data structure stores voice signals comprising a conversation list containing an entry for each of one or more phone conversations. Each entry comprising a single string of data records wherein each data record has a file pointer to the next record, the last record having an end of file marker. Each record corresponds to at least one time stamp of the phone conversation for use in restoring the data structure to a media understandable by a subscriber. The computer-readable medium containing a data structure represents the stored data on a memory element created by any of the previous embodiments. The data structure is composed of conversations that are stored as computer file records. Each file represents a single conversation and is a single string of data broken into records. The records contain pointers to each following record, allowing the records to be stored non-sequentially in the memory element yet preserving the sequential nature of the conversation on playback. The last record of a file contains an end of file marker. If the file includes multimedia material, such as video conference information, the time frames of video corresponding to recorded speech are also saved. When the record is played back only the corresponding speech and video sequences are played.

A fifth embodiment describes a method in a mobile set for a subscriber to select data to be stored. The method comprises the displaying of a plurality of recording modes while indicating a selection means for choosing a recording mode. The subscriber then selects a recording mode and the mobile set provides a confirmation signal after a recording mode has been selected. While the methods of the present invention are principally designed to streamline the recording of speech time frames without recording non-speech containing time frames, a subscriber may manually opt to have all frames of a conversation recorded, or only one line recorded. Thus a subscriber may manually select from a command list. In response to a selection from the command list, the mobile set will record all speech time frames (both data and non-data containing frames), record only the uplink signal, only the downlink signal, or only data containing frames of either the uplink or downlink signals. Further the command list will provide the user with the option of not recording accompanying multimedia time frames corresponding to the voice time frames. Or, in response to a different response from the command list, record the multimedia time frames independently from the voice time frames.

A sixth embodiment of the present invention describes a method in a mobile set for replaying recorded conversations. The method comprising displaying a line indicating a data structure of recorded conversations and in response to selection of the displayed line, replaying a recorded conversation. The command list allowing stored data to be played back may be available to a subscriber during a conversation, so if a subscriber wishes to replay information he may do so while he is still in a conversation.

Finally a mobile set having a voice recording means for storing voice conversations is disclosed. The mobile set of the present invention can record signals received through the mobile set and can playback at least a portion of those signals on the mobile set. The mobile set comprises an uplink/downlink switch for selecting speech frames from either a uplink or downlink signal, at least one switching logic controller for switching between the uplink and downlink signals, a method of file header generation for generating headers for recorded speech files, a recorder controlling means for configuring and controlling of a recorder operation in one of several modes available to a subscriber and a memory element capable of storing the voice recordings.

DETAILED DESCRIPTION OF THE INVENTION

Prior to the discussion of the present invention, certain terms used herein convey a meaning which extends beyond their ordinary meaning in the field of the present invention. For clarification the following definitions are used in this description.

"Data stream" refers to the information stored into memory and relayed from the processor of the mobile set to the memory element. The data stream contains a series of data records which are formatted similar to any of a variety of computer files. Each record possesses a pointer to the next sequential record, and the last record in the file contains and end-of-file marker. "Data stream" refers to a single stored file of information and may comprise any number of data records. The "data stream" is composed of compressed data containing either digital or analog voice information, or other electronically storable information (such as video, e-mail or computer files).

"Downlink" refers to any signal received by a mobile set regardless of source.

"Memory" as used herein refers to any media capable of storing information in electronic form. Though computers and mobile phones often use flash memory for storing information, the present discussion includes either the use of persistent memory (retaining information even if no power is supplied to the memory element) and flash memory, having the characteristic of not being able to store information without constant power supplied to the memory element. In the discussion of the present invention the term "memory" is used to signify either flash memory, or persistent memory.

"Mobile set" is used to describe any number of portable communications devices, and is not restricted to the field of commercially available cell phones. Although "mobile set" certainly includes cellular phones, it also more generally includes any GSM compatible phone, mobile communications phone (such as two way radio, "walkie-talkie", satellite phones, etcetera). The use of the term "mobile set" furthermore is not restricted to portable communications devices based strictly on speech. The use of "mobile set" in the present invention also includes portable communications device which, in addition to being able to send and receive voice signals, are also capable of sending and receiving data signals of various types (such as video (multimedia), e-mail, computer files and non-voice style electronic information in general).

"Playback" refers to the recovery and restoration of data (digital or analog) into a media the subscriber can understand. It also requires the correct timely organization of all the data in the same sequence as originally received. While the data management system of the present invention includes the ability to receive and record several types of data streams, the playback feature allows the reproduction of all stored data as well as the ability to properly assign time codes to non-voice information which may be stored. The nature of the invention in several embodiments does not permit "true" playback. That is the playback of the recorded information is not 100% restored to its original form. Indeed often only half of the original data (or less) will be part of the data available for playback. While "true" playback is possible, it is not in any way suggested nor required in the present invention.

"Streamlining" refers to the process by which a processor accesses a variety of different data time frames and connects them into a single data stream while preserving the identity and source of each data record. Streamlining is a process by which multiple data types of both voice and non-voice information may be connected accurately into a single data string, and recovered later without errors in reproduction of the original various signals. The processor in a mobile set performs a number of functions at various times or cycles. The processor acts as a frame comparator, determining which time frames are to be forwarded to the data recorder. As a frame comparator the processor may substitute or delete any particular frame. The processor also operates as the voice activity detector (VAD). The combined different processes cycles the processor engages in to create the single data stream for recording is referred to as "Streamlining."

"Subscriber" refers to anyone using a mobile set.

"Uplink" refers to any transmission of information from the mobile set.

The present invention relates to a system and method of recording voice conversations in using a mobile set. The basic structure of a mobile set used as a portable communications device is loosely shown in FIG. 1. The mobile set 20 operates in a cell 22, which exists in a larger communications network such as a Public Land Mobile Network (PLMN) 10. Within each cell 22 are base stations 24 used as receivers and transmitters of the signals used to communicate with a mobile set 20. The various signals into and out of the base stations 24 are controlled through a series of controllers, registries, and routing equipment that makes up different parts of the PLMN 10. For the purposes of this disclosure, only signals to and from the mobile set 20 are considered, and the routing of information and signals through the whole of the PLMN are not discussed. Whenever a subscriber uses a mobile set 20 to communicate, all uplink signals are transmitted to the base station 24 of the cell 22, and all incoming signals come through the base station 24 through the PLMN 10. The exception to this occurs in radio phones or other communications devices designed to communicate directly with each other without the use of a base station.

Figure 1:
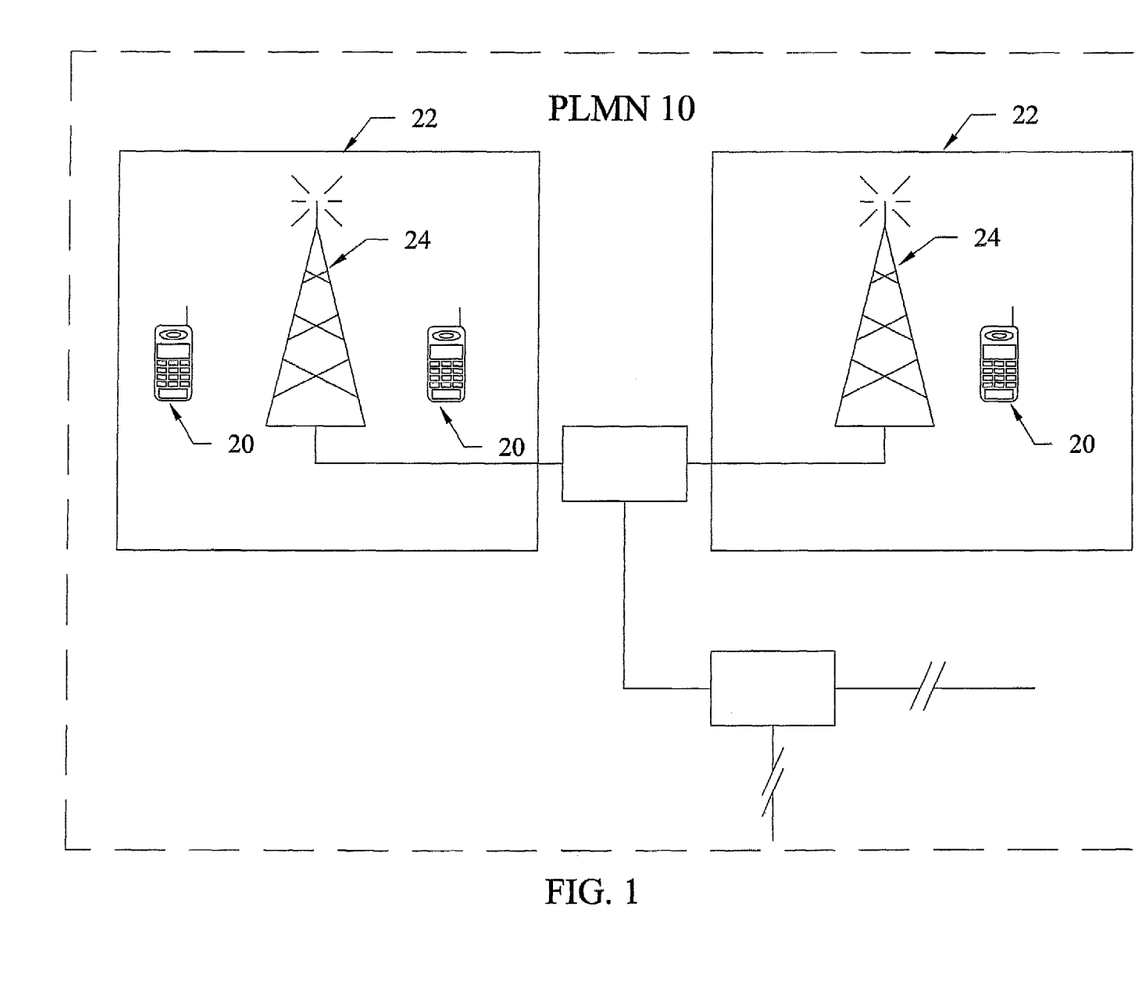
FIG. 1 illustrates the relationship of mobile sets and a base station in operation.

All signals received by the mobile set 20, whether from a wire line caller, or another mobile subscriber, will be received by a mobile set 20 through the base station 24. Any transmissions from the base station 24 to the mobile set 20 are referred to herein as downlink signals. Any transmissions from the mobile station 20 to the base station 24 are uplink signals. Signals transmitted between the base station 24 and the mobile station 20 are generally digital signals. It is often the case the mobile subscribers will call each other from their mobile sets 20 and those uplink signals go to a base station 24, are processed through the PLMN 10 before being re-transmitted to the appropriate receiving mobile set 20. As the technology and options of mobile sets and base stations (and PLMNs) increases, conference calls between multiple mobile subscribers and wire line callers will be possible. In any combination of communications from either wireless or wire line subscribers, the present invention can successfully record the voice and data signals to, and from, a mobile set.

To preserve memory space, the present invention describes a method for a mobile set to storing voice recordings. In its basic form, the method comprises controlling a voice activity detector to identify speech containing time frames from at least one uplink and at least one downlink signal. Once the speech containing time frames are identified, the speech containing time frames are recorded. The speech containing time frames from the uplink and downlink signals are recorded sequentially with a time stamp for each time frame.

For the method of the present invention, a dedicated voice activity detector may be used as part of the architecture in the mobile set 20. However it is more common in GSM compatible phones that part of the design of the GSM mobile set 20 allows the processor 108 to operate as a voice activity detector during certain operation cycles. Reference to a cycle here does not mean a single clock cycle, but rather a series of clock cycles which are required to execute a single function in the processor (such as encoding a speech frame, decoding a speech frame, or comparing two frames, etcetera). This feature is generally related to the uplink side for preserving battery life. Thus for the present invention the method may utilize the voice activity detector cycles of the processor 108 of a GSM phone and tie in the downlink signal into the voice activity detector cycles as an extra series of instructions. Both the uplink and downlink signals are paired based on their time frames and recorded as a single data stream into memory 112. The processor records each time frame of uplink and downlink signal alternating between the two sources.

Figure 2:
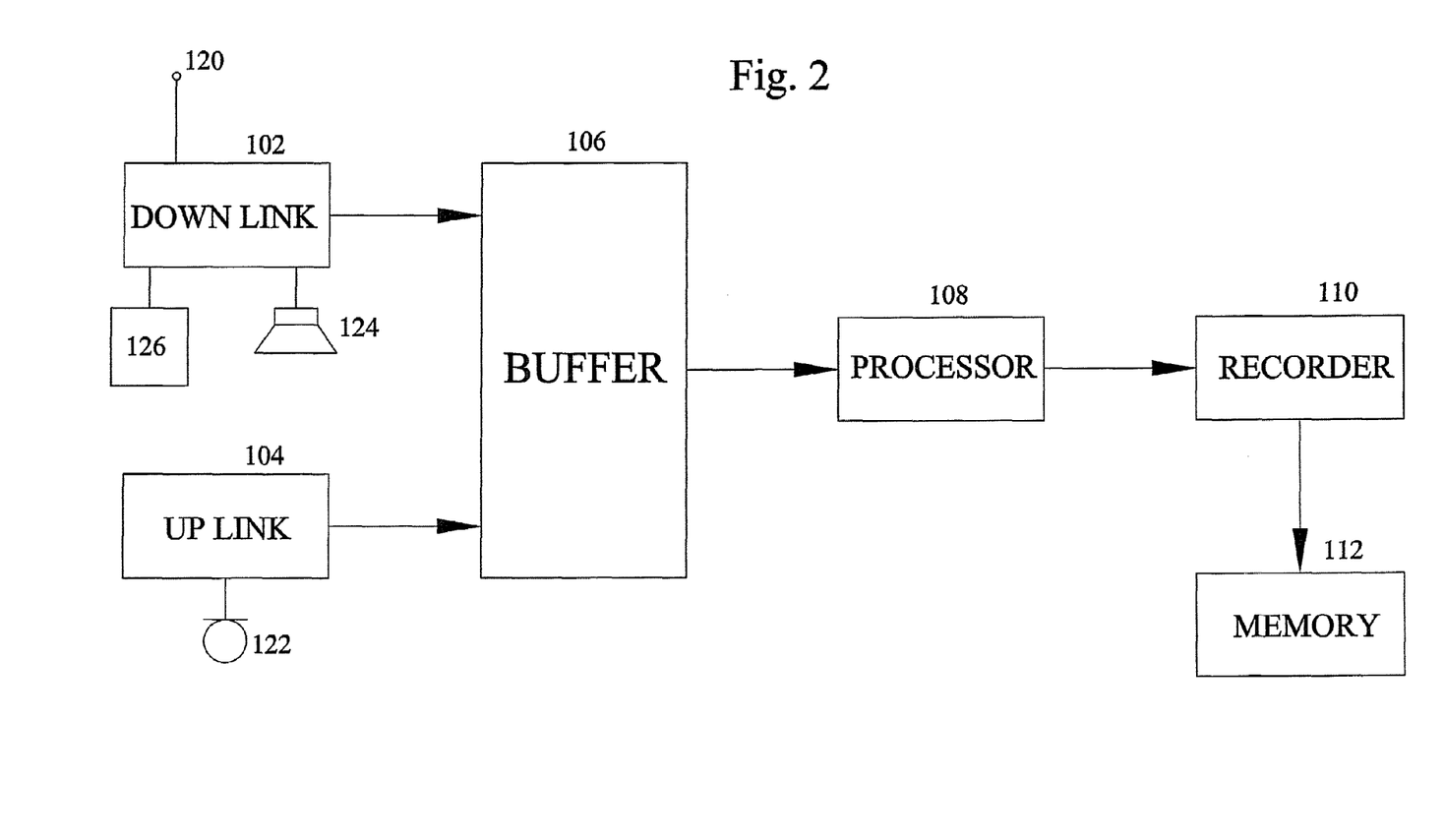
FIG. 2 shows the basic logic steps for sequential file recording.

Referring now to FIG. 2, the method sorts received or downlink 102 signals and uplink 104 signals in the processor 108. The processor 108 may have a built in memory buffer 106, or it may be separate as shown. The processor 108 alternates between time frames of the downlink 102 and uplink 104 signals, arranging them into a single data stream for recording into memory 112. Simultaneously the uplink 104 signal is sent to the antenna 120 for transmission, and the downlink 102 signal is converted into a form the subscriber can understand at either the speaker 124 or display 126.

Another method comprises receiving both uplink 104 and downlink 102 signals and storing them in the processor buffer 106. The uplink 104 and downlink 102 signals are compared to each other in the voice activity detector cycle. The signals compared to each other must have the same time stamp (be of the same time frame). In operation, each time frame that is processed through the voice activity detector 108 is assigned a logic value. Time frames designated as record worthy (value 1) are recorded while those not record worthy (value 0) are dropped from the data stream to be recorded. The dropped data frames are replaced with a placeholder that permits the playback to accurately reproduce pauses in the original conversation. The manner of replacing non-record worthy time frames with placeholders may be done by various data compression means and is not per se an inventive aspect of the present invention. In this method only half the data of the conversation is recorded. In general conversation, only one person is speaking at a time. To preserve memory 112 space the method of the present invention distinguishes the speech and non-speech time frames and records only the speech containing time frames. The non-speech containing time frames are dropped from the data stream that is recorded. Because a placeholder is inserted into the space of each time frame that is not recorded, the linear time relationship between the speech containing time frames is not lost. When the uplink 104 and downlink 102 signals for a particular time frame both contain no speech, only one placeholder need be inserted into the recording data stream. The placeholder for the non-speech containing frames will be restored to non-speech pauses when the data is recovered for playback. The signals to be recorded are then sent to memory 112 while the buffer is cleared for the next batch of time frames. Processors generally operate at a much faster cycle time than the rate at which uplink and downlink time frames are loaded into the buffer. Thus the voice activity detector cycles can clear the buffer of stored speech time frames without the buffer becoming full. Once the time frames are selected for recording, they are arranged into a single data stream by the processor 108. This maximizes space as the data stream can now be recorded as a computer file composed of records. Each record has a record pointer showing where the next sequential record is. The last record has an end of file marker. The file may contain records which contain both voice and non-voice data.

Thus the voice activity detector cycle looks at both the uplink and downlink time frames and assigns them a logic value of one or zero. The following example shows the logic executed by the voice activity detector cycle and the processor during a "frame comparator" step. The voice activity detector determines if the speech time frame (either uplink or downlink source) contains record worthy data. If so the time frame is assigned a high logic value (1). If not the frame is given a low logic value (0). Once the speech frames for a given time are assigned values, they are returned to the buffer 106 for the next processor cycle. The processor 108 then retrieves the data from the buffer 106 and sends the high logic value frames to the data recorder 110 for recording. The low logic value frames are dropped, and substituted with a placeholder as previously described (However to further conserve space in memory, the place holder for a low logic speech frame may be omitted (except where both uplink and downlink signals contain no data). The proper sequence of timing for the speech frames can be derived from only the high logic frames that are recorded). The processor acts as a switching logic controller in determining which time frame to record when sorting through the uplink and downlink signals (or various uplink and downlink signals).

EXAMPLE 1

$U_1=1$ then record
$U_1=0$ then drop
$D_1=1$ then record
$D_1=0$ then drop.

The recorded data stream, after stream lining may look like $U_1, D_1, U_2, D_2$, etc. . . .

The high logic time frames are recorded into a single data stream to allow for the file record to be stored as a computer file. Depending on the operation of the mobile set, the operation of the voice activity detector cycle and file comparator cycles may be combined into just the voice activity detector cycle. The added benefit is high logic signals may be sent directly to the data recorder without having to go back into the memory buffer, which reduces the power consumption of the operation.

The methods described above are also executable when dealing with signals from a non-voice source, such as video, text messaging, e-mail or other signal the mobile set is capable of receiving. As the abilities of mobile sets expand, and offer additional features to subscribers, such as mobile video conference calling, wireless e-mail and web browsing, the next generation of mobile set will have a much broader array of data to contend with. Memory for recoding information in a mobile set will therefore be at a premium. The recording of video signals accompanying voice signals (such as in a conference call) may be selectively handled so that only the video time sequences corresponding to record worthy voice signals are recorded. The uplink and downlink signal paths would similarly be tracked so the voice and video of the appropriate source is maintained.

Figure 3:
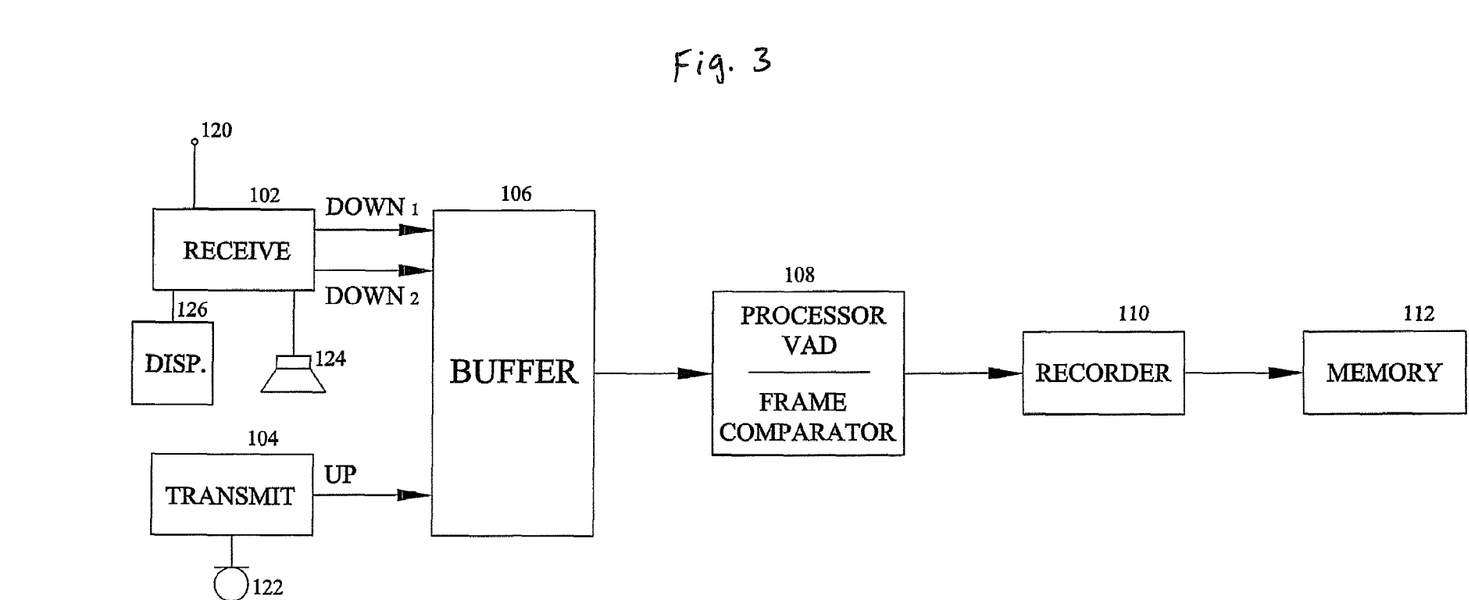
FIG. 3 shows the basic logic for multiple signal processing.

By way of example, if a mobile set is receiving two downlink signals of voice ($D_1$ and $D_2$), and two downlink signals of video, then only the video time frame corresponding to the record worthy voice time frame (when some one is speaking) will be recorded (FIG. 3). Thus the party of the actual phone conversation who is not speaking, is not recorded for either voice, or video. The data received goes to the processor as events, and the operation performed is either the voice activity detection (VAD) or frame comparator (FC). The FC cycle executes a logic yielding in data recording of an uplink signal ($U_n$), downlink signal ($D_n$) or placeholder ($P_L$).

EXAMPLE 2

VAD/FC Operation and result

| Event | Operation | logic | Record |
|---|---|---|---|
| 1 | VAD | $D_1=1$ or $D_1=0$ | n/a |
| 2 | VAD | $D_2=1$ or $D_2=0$ | n/a |
| 3 | FC | If $D_1=1$ then $V_1=1$, then record $D_1$ and $V_1$. | $D_1, V_1$ |
| 4 | FC | If $D_1=0$, then $V_1=0$, then drop $D_1$ and $V_1$. | $P_L$ |
| 5 | FC | If $D_2=1$ then $V_2=1$, then record $D_2$ and $V_2$. | $D_2, V_2$ |
| 6 | FC | If $D_2=0$, then $V_2=0$, then drop $D_2$ and $V_2$. | $P_L$ |
| 7 | VAD | $U_1=1$ or $U_1=0$ | n/a |
| 8 | FC | If $U_1=1$, then $U_2=1$, then record $U_1$ and $U_2$. | $U_1, U_2$ |
| 9 | FC | If $U_1=0$, then $U_2=0$, then drop $U_1$ and $U_2$. | $P_L$ |

In this example, the data stream which is recorded is derived in the frame comparator cycle, and may appear like $D_1, V_1, P_L, D_2, V_2, P_L, U_1, U_2, P_L$. Alternatively, if the PL is not recorded where there is a frame of actual data, the data stream would look like $D_1, V_1, D_2, V_2, U_1, U_2$.

The execution of these methods originates from a computer-readable medium containing instructions for controlling a mobile set processor to record multimedia signals. The computer-readable medium comprises instructions for controlling a processor (VAD/FC) to compare a plurality of voice signals having identical time stamps, and arranging the voice signals such that data containing time stamp sequences are sequential in a single data file. The computer readable-medium also has instructions for controlling a processor to identify non-voice signals containing the same time stamp as data containing voice time stamp sequences. Then the data containing voice signals and the corresponding time stamp non-voice signals are sequentially recorded such that both the voice and non-voice data signals are recorded into a memory element as a single data file. However it is not necessary that computer files, such as text messages or application data files, be recorded into memory in the same manner as voice and video. These files would be stored in whole without any insertion of placeholders for actual data. An arrangement of multiple data files forms a data structure in the memory element.

The memory element then forms a computer-readable medium containing a data structure for storing voice signals. The data structure comprises a conversation list containing an entry for each of one or more phone conversations. Each entry comprising a single string of data records wherein each data record has a file pointer to the next record, the last record having an end of file marker. Depending on how a particular mobile set is designed to store information, each record will corresponding to one or more time frames of the phone conversation for use in restoring the data structure to a media format understandable by a subscriber.

As described in the method of selecting signals for recording, the data may contain voice and multi-media data, with fragments of various types of data strung together into a single data stream. In the case of a mobile set that also acts as a PDA (Personal Data Assistant) the mobile set may also have the ability to record computer files. Files received by the mobile set may be stored sequentially, or contain a file pointer in the last record of the file that identifies any attachments.

While the computer-readable medium of the present invention has a default method of determining what data is "record worthy" a subscriber may alter the default method by instructing the mobile set to record information in a variety of other methods. Therefore an additional method in a mobile set for selecting data to be stored comprises displaying a plurality of recording modes, indicating a selection means for choosing a recording mode; and in response to selection of the displaying a plurality of recording modes, a different method of recording is selected. In this manner a subscriber can choose to record all time frames of both the uplink and downlink signals, or record only the uplink, or only downlink. Where multimedia files are concerned, this option permits the user to preserve memory space by ignoring multimedia material except voice. Or the subscriber can turn recording off completely.

Figure 4:
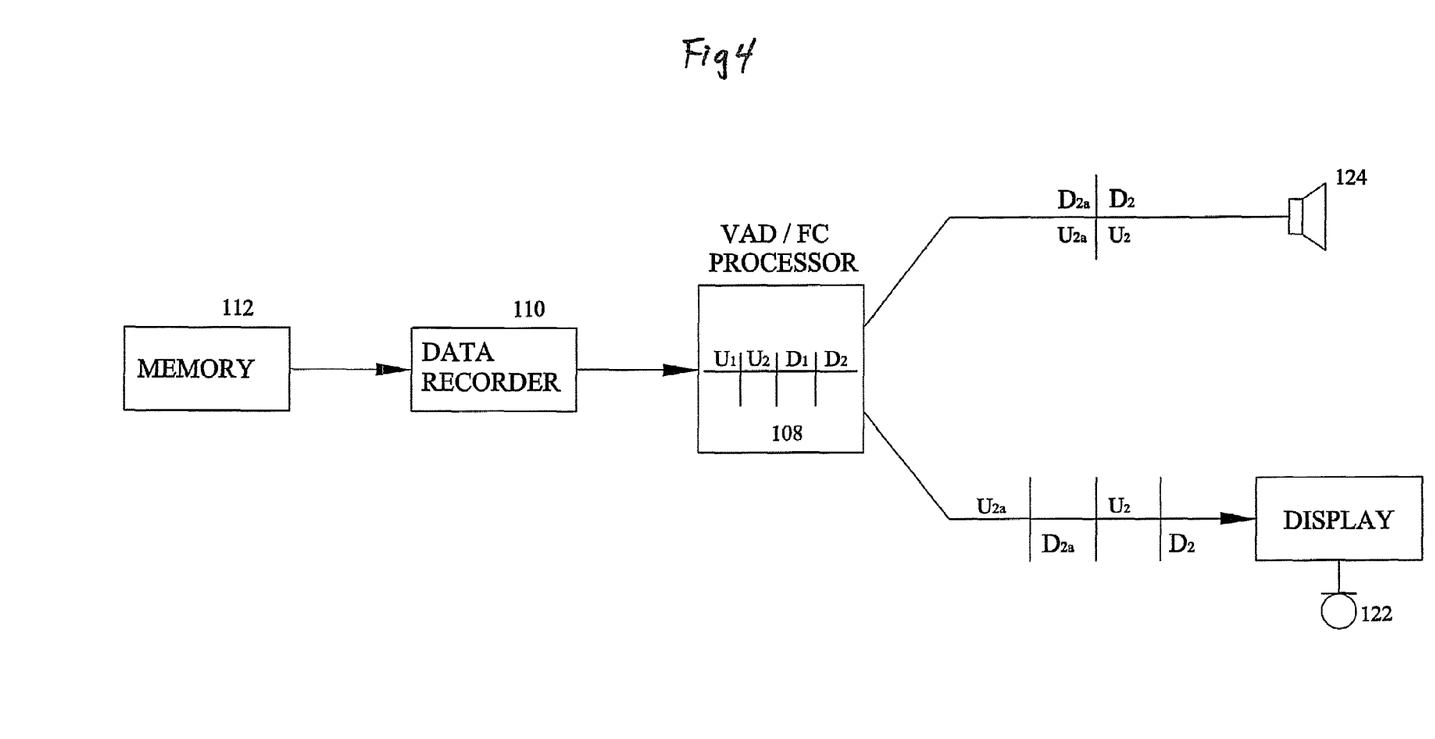
FIG. 4 shows the logic for playback of recorded data.

Recalling stored information (FIG. 4) from the data structure involves displaying a line indicating a data structure of recorded conversations, and in response to a selection of the displayed line, replaying a recorded conversation. In addition to the ability to recall a previously recorded message, the mobile set of the present invention would allow a subscriber to review recorded conversations using a variety of speed controls, or segment replay controls (replaying a few seconds of voice where the audio is garbled or difficult to distinguish).

Another feature of the present invention is the ability to recall and playback recorded conversations while using the mobile set as a phone. In this manner a subscriber may recall a previously recorded conversation (either of the current call, or a previous call) and play it back for the subscriber, or transmit the recorded data through the uplink signal.

Finally a mobile set having a voice recording means for storing voice conversations is disclosed. The mobile set of the present invention can record signals received through the mobile set and can playback at least a portion of those signals on the mobile set. The mobile set comprises an uplink/downlink switch for selecting speech frames from either a uplink or downlink signal, at least one switching logic controller for switching between the uplink and downlink signals, a method of file header generation for generating headers for recorded speech files, a recorder controlling means for configuring and controlling of a recorder operation in one of several modes available to a subscriber and a memory element capable of storing the voice recordings.

What is claimed is:

1. A cellular phone, comprising:
    a memory;
    a processor operatively coupled to the memory,
    wherein the processor receives a first set of downlink signals from a first participant and a second set of downlink signals from a second participant, the first participant and the second participant participating in a video conference call,
    wherein the first set of downlink signals comprises first voice signals and first video signals, the first voice signals corresponding to the first video signals,
    wherein the second set of downlink signals comprises second voice signals and second video signals, the second voice signals corresponding to the second video signals,
    wherein the processor compares the downlink signals of the first set, the downlink signals of the second set and uplink signals that are in a particular time frame with a same time stamp,
    wherein the processor assigns one of a first logic value and a second logic value to the particular time frame corresponding to at least one of the first set of downlink signals, the second set of downlink signals and the uplink signals,
    wherein the processor stores the portions of the first set of downlink signals, the second set of downlink signals and the uplink signals that are assigned the first logic value in the memory, and
    wherein the processor drops all of the portions of the first set of downlink signals, the second set of downlink signals and the uplink signals that are assigned the second logic value in the memory and does not insert a placeholder for the dropped signals.

2. The cellular phone according to claim 1, wherein the first set of downlink signals, the second set of downlink signals and the uplink signals are sequentially considered for storage in the memory according to a corresponding time frame or time stamp.

3. The cellular phone according to claim 1, wherein the first set of downlink signals, the second set of downlink signals and the uplink signals that are assigned the first logic value are stored in the memory as a single data stream.

4. The cellular phone according to claim 1, wherein the first set of downlink signals, the second set of downlink signals and the uplink signals that are assigned the first logic value are stored in the memory as a single electronic file.

5. The cellular phone according to claim 1, wherein the processor stores a placeholder instead of the first set of downlink signals, the second set of downlink signals and the uplink signals that are assigned the second logic value.

6. The cellular phone according to claim 1, wherein the processor assigns the first logic value to the first set of downlink signals of the particular time frame if the first voice signals indicates that the first participant is speaking.

7. The cellular phone according to claim 6, wherein the processor assigns the first logic value to the first voice signals and the first video signals of the particular time frame if the first participant is speaking.

8. The cellular phone according to claim 1, wherein the processor assigns the second logic value to the first set of downlink signals of the particular time frame if the first voice signals indicates that the first participant is not speaking.

9. The cellular phone according to claim 1, wherein the processor assigns the second logic value to the first voice signals and the first video signals of the particular time frame if the first participant is not speaking.

10. The cellular phone according to claim 9, wherein the cellular phone is a Global System for Mobile Communication (GSM) phone.

11. The cellular phone according to claim 1, wherein the first set of downlink signals comprises first data signals.

12. The cellular phone according to claim 1, wherein the first set of downlink signals comprises first multimedia signals.

13. A cellular phone, comprising:
    circuitry that receives a first set of downlink signals from a first participant and a second set of downlink signals from a second participant, the first participant and the second participant participating in a video conference call,
    wherein the first set of downlink signals comprises first voice signals and first video signals, the first voice signals corresponding to the first video signals,
    wherein the second set of downlink signals comprises second voice signals and second video signals, the second voice signals corresponding to the second video signals,
    wherein the circuitry analyzes the first voice signals, the second voice signals and uplink signals that are in a particular time frame with a same time stamp,
    wherein the circuitry assigns one of a first logic value and a second logic value to the first voice signals in the particular time frame with the same time stamp, wherein the circuitry assigns one of the first logic value and the second logic value to the first video signals in the particular time frame with the same time stamp depending upon which logic value is assigned to the first voice signals in the particular time frame with the same time stamp,
    wherein the circuitry assigns one of the first logic value and the second logic value to the second voice signals in the particular time frame with the same time stamp, wherein the circuitry assigns one of the first logic value and the second logic value to the second video signals in the particular time frame with the same time stamp depending upon which logic value is assigned to the second voice signals in the particular time frame with the same time stamp,
    wherein the circuitry stores for playback the portions of the first set of downlink signals, the second set of downlink signals and the uplink signals that are assigned the first logic value, and
    wherein the circuitry drops all of the portions of the first set of downlink signals, the second set of downlink signals and the uplink signals that are assigned the second logic value.

14. The cellular phone according to claim 13, wherein the first set of downlink signals, the second set of downlink signals and the uplink signals are sequentially considered for storage according to a corresponding time frame or time stamp.

15. The cellular phone according to claim 13, wherein the first set of downlink signals, the second set of downlink signals and the uplink signals that are assigned the first logic value are stored as a single data stream.

16. The cellular phone according to claim 13, wherein the first set of downlink signals, the second set of downlink signals and the uplink signals that are assigned the first logic value are stored as a single electronic file.

17. The cellular phone according to claim 13, wherein the circuitry stores a placeholder instead of the first set of downlink signals, the second set of downlink signals and the uplink signals that are assigned the second logic value.

18. The cellular phone according to claim 13, wherein the circuitry assigns the first logic value to the first set of downlink signals of the particular frame if the first voice signals indicates that the first participant is speaking.

19. The cellular phone according to claim 18, wherein the circuitry assigns the first logic value to the first voice signals and the first video signals of the particular frame if the first participant is speaking.

20. The cellular phone according to claim 13, wherein the circuitry assigns the second logic value to the first set of downlink signals of the particular frame if the first voice signals indicates that the first participant is not speaking.

21. The cellular phone according to claim 13, wherein the circuitry assigns the second logic value to the first voice signals and the first video signals of the particular time frame if the first participant is not speaking.

22. The cellular phone according to claim 13, wherein the cellular phone comprises a Global System for Mobile Communication (GSM) phone.

23. The cellular phone according to claim 13, wherein the first set of downlink signals comprises first data signals.

24. The cellular phone according to claim 13, wherein the first set of downlink signals comprises first multimedia signals.

* * * * *